Feb. 29, 1944.     C. M. HINES     2,342,805
BRAKE APPARATUS
Filed May 27, 1942
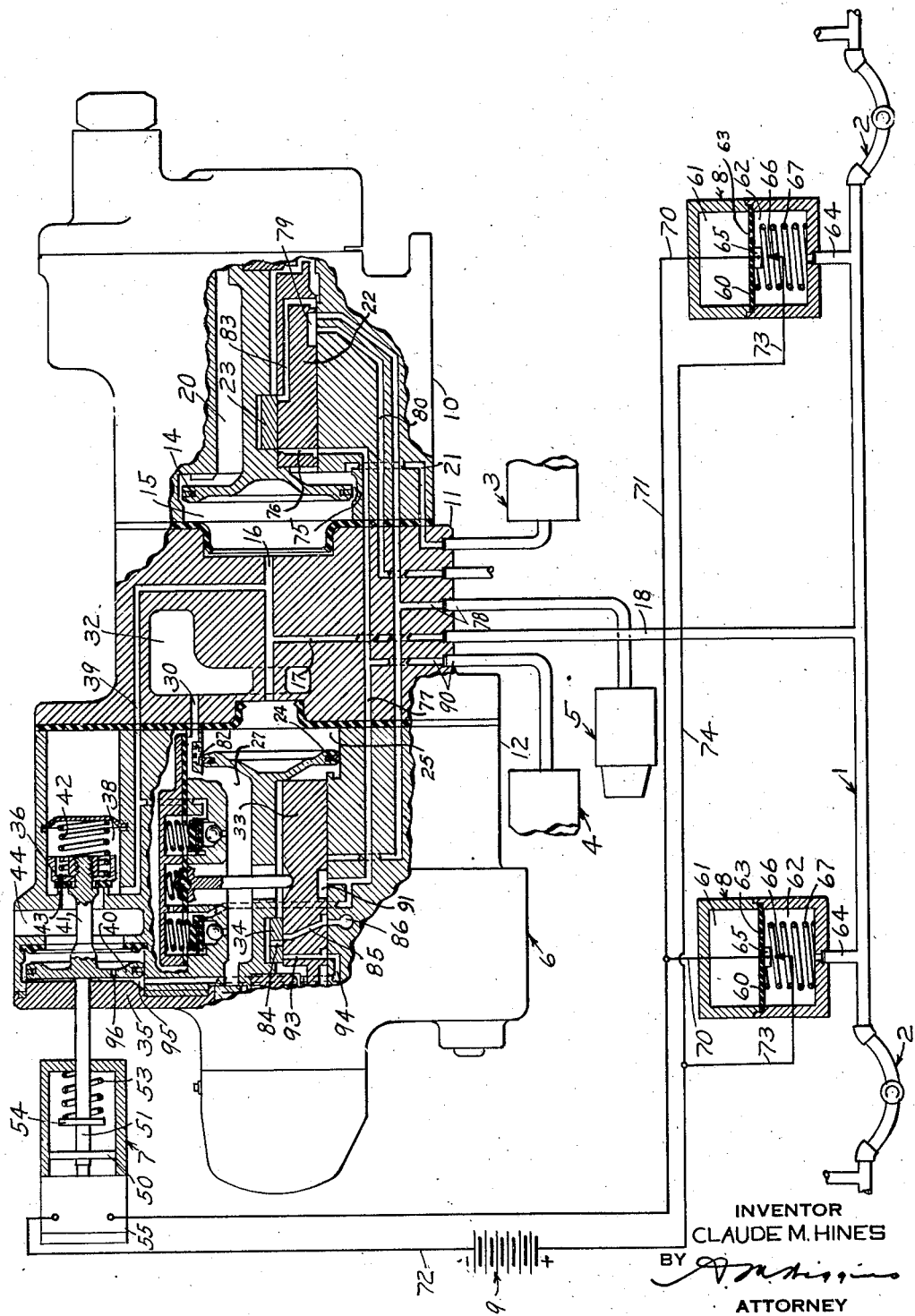
INVENTOR
CLAUDE M. HINES
BY
ATTORNEY Patented Feb. 29, 1944

2,342,805

UNITED STATES PATENT OFFICE 2,342,805

BRAKE APPARATUS

Claude M. Hines, Pittsburgh, Pa., assignor to The Westinghouse Air Brake Company, Wilmerding, Pa., a corporation of Pennsylvania Application May 27, 1942, Serial No. 444,674

10 Claims. (Cl. 303—82)

This invention relates to brake apparatus and more particularly to fluid pressure brakes of the type having means for effecting quick serial action through the brake pipe of an automatic fluid pressure brake system.

It is highly desirable that the quick action means which is employed to effect a local reduction in brake pipe pressure shall respond as quickly as possible to a sudden reduction in brake pipe pressure initiated in effecting an emergency application of the brakes, since on a long train the brakes are liable to be applied on cars at the head end of the train so much in advance of the application of the brakes at the rear end of the train as to cause the running in of the slack at such a rate as to occasion severe shocks.

In order to secure dependable and proper operation of the brakes, a new standard freight brake equipment has been adopted which is known as the "AB" freight brake equipment. This latest type of brake equipment has numerous improved features, an important one of which is that it effects a great increase in the speed of propagation of a pressure reduction or pressure increase wave through the brake pipe, so that even on exceptionally long trains the application of the brakes on all the cars of the train is effected in a manner such as to prevent the intolerable shocks and jars to the cars due to harsh running-in or running-out of the slack in the train.

In recent years the advent of very high speed passenger trains has made necessary an even higher rate of propagation of a brake application and release, and accordingly brake equipments have been developed which have a primary or electrical control, and a secondary or pneumatic control, so that if an electrically controlled application of the brakes is initiated and fails to take effect, the brakes may then, either manually or automatically, be applied pneumatically. Such a combined electrically and pneumatically controlled train brake equipment is necessarily elaborate in character and rather costly, and while practicable and justifiable in many cases for passenger trains, is as yet unjustifiable for freight trains.

It is accordingly an object of my invention to provide a train brake equipment of the pneumatically controlled type wherein the speed of serial quick action transmission is materially increased.

Another object of the invention is to provide accelerating means applicable to the "AB" freight brake equipment on existing cars for increasing the speed of propagation of an emergency brake control impulse serially through the train.

A specific object of the invention is to provide accelerating means applicable to "AB" freight brake equipment for expediting an emergency braking impulse through a railway train by propagating the impulse electrically and automatically from one end of a car to the other and then propagating the impulse pneumatically through the usual hose coupling to the next succeeding car.

A further object of the invention is to provide a local source of electrical energy on each car equipped with the accelerating means, so that each car so equipped operates as a unit and will be effective when used in a train having cars not so equipped and a still further feature resides in the fact that each car operates as a unit to permit hte propagation of an emergency braking impulse electrically without the use of train wires which extend across the space between the adjacent ends of coupled cars.

Other objects and advantages will be apparent from the following more detailed description of the invention.

In the accompanying drawing the single figure is a diagrammatic view, partly in section, of a fluid pressure brake apparatus embodying the invention as applied to a single car.

As shown in the accompanying drawing, the equipment comprises a brake pipe 1 which extends the full length of the car and which is provided with a hose coupling 2 at each end of the car, for connecting with the adjacent car, an auxiliary reservoir 3, an emergency reservoir 4, a brake cylinder 5, a brake controlling valve device 6, a magnetically operated device 7, a pair of fluid pressure operated switch devices 8 disposed one at each end of the car, and a local source of electric energy, such, for instance, as a storage battery 9.

The brake controlling valve device 6 may be of any suitable type but as shown is of the "AB" type of a construction very similar to that disclosed in Patent No. 2,031,213 issued to Clyde C. Farmer on February 18, 1936, but only those parts are shown which are deemed essential to a comprehensive understanding of the invention, and the following description of parts and operation will likewise be limited.

This brake controlling valve device comprises a service portion or valve device 10 mounted on a pipe bracket 11, and also comprises an emergency portion or valve device 12 mounted on another face of said pipe bracket.

The service portion comprises a piston 14 having at one side a piston chamber 15 connected through passages 16 and 17 and a branch pipe 18 to the brake pipe 1, and at the opposite side there is a valve chamber 20 which is connected to a passage 21 leading to the auxiliary reservoir 3. A main slide valve 22 and an auxiliary slide valve 23 are disposed in valve chamber 20 and are adapted to be operated by the piston 14.

The emergency portion 12 comprises an emergency piston 24 having at one side a chamber 25 connected to the brake pipe 1 by way of passages 16 and 17 and the branch pipe 18 and having at the opposite side a valve chamber 27 connected to a passage 30 which leads to a quick action chamber 32, said valve chamber containing a main slide valve 33 and an auxiliary slide valve 34 adapted to be operated by the emergency piston 24.

A brake pipe vent valve device 35 is preferably associated with the emergency valve device 12 and comprises a vent valve 36 contained in a chamber 38 which is connected through a passage 39 and passages 16 and 17 and branch pipe 18 to the brake pipe 1. The device also comprises a piston 40 which is connected to said valve by a stem 41. A spring 42 is provided in chamber 38 and acts on the valve 36 to normally maintain the valve seated against a seat rib 43 on the casing of the device, thereby closing communication from the brake pipe chamber 38 to a chamber 44 which is open to the atmosphere.

The magnetically operated device 7 comprises a casing which is rigidly secured to the emergency portion of the control valve device. Slidably mounted in the casing is a circular guide member 50 having a stem 51 which extends to the exterior of the casing, and which is slidably guided in the casing of the brake pipe vent valve device. The end of the stem engages the face of the vent valve piston 40. The member 50 and stem 51 are normally maintained in the position, shown in Fig. 1 of the drawing, by means of a spring 53 which is interposed between and operatively engages the inner wall of the casing and a collar 54 carried by the stem and is operative to a position to effect operation of the vent valve piston by means of an electromagnet 55 upon energization of the winding thereof.

The fluid pressure operated switch devices 8 are identical in construction and are disposed one at each end of the car as near the hose coupling or angle cock (not shown) as possible. Each device comprises a two piece casing having clamped therebetween a flexible diaphragm 60. Provided at one side of the diaphragm is a chamber 61 and at the opposite side a chamber 62, which chambers are connected together by means of a port 63 provided in the diaphragm. The chamber 62 of each device is connected to the brake pipe 1 by means of a branch pipe 64.

Mounted on the diaphragm 60 is a contact 65 which is adapted to be moved into engagement with a stationary contact 66 contained in chamber 62. Also contained in chamber 62 is a spring 67 which tends at all times to urge the contact 65 out of engagement with the stationary contact 66.

The contact 65 of each device is connected by means of a wire 70 with a wire 71 which is connected to one end of the winding of the electromagnet 55. The other end of this winding is connected to one terminal of the storage battery 9 by means of a wire 72.

The stationary contact 66 of each switch device is connected to the opposite terminal of the battery 9 by means of wire 73 and connected wire 74.

Operation

In order to initially charge the fluid pressure brake equipment, fluid under pressure is supplied to brake pipe 1 in the usual well known manner, and from thence flows through the pipe 64 at each end of the car to the chamber 62 of each fluid pressure operated switch device 8. Fluid under pressure thus supplied to chamber 62 in each device flows through port 63 in the diaphragm 60 to chamber 61. From this it will be seen that chambers 62 and 61 in each device are charged with fluid at the pressure of fluid in the brake pipe 1. With the chambers 62 and 61 of each device thus charged to the same pressure, spring 67 in each device acts to maintain the switches in their contact open position as shown in the drawing.

Fluid under pressure supplied to brake pipe 1 also flows through branch pipe 18 and passages 17 and 16 to piston chambers 15 and 25 and from passage 16 through passage 39 to the vent valve chamber 38.

With the service piston 14 and slide valve 22 and 23 in their normal position, as shown in the drawing, fluid under pressure supplied to chamber 15 flows through a feed groove 75 to valve chamber 20 and from thence through passage 21 to the auxiliary reservoir 3. Fluid under pressure in chamber 20 also flows through a port 76 in the main slide valve 22 to a passage 77 which communicates with the emergency reservoir 4, so that the valve chamber 20 and reservoirs 3 and 4 become charged with fluid at the pressure carried in the brake pipe 1.

With the slide valve 22 in the normal or release position, the brake cylinder 5 is in open communication with the atmosphere through a pipe and passage 78, a cavity 79 in the slide valve 22 and an atmospheric passage 80.

Fluid under pressure supplied from the brake pipe 1 to the emergency piston chamber 25 flows through a restricted charging port 82 to the passage 30 and from thence in one direction to the emergency valve chamber 27 and in the opposite direction to the quick action chamber 32 thereby charging said chambers with fluid at the pressure in the brake pipe 1.

Service application of the brakes

If it is desired to effect a service application of the brakes a service rate of reduction in pressure is effected in brake pipe 1 and consequently in the branch pipe 18 and branch pipe 64 at each end of the car. Upon such a reduction in pressure in the pipes 64 the pressure of fluid in chamber 62 and connected chamber 61 of each switch device 8 is reduced at substantially the same rate as the service rate of reduction in the brake pipe 1, so that the pressure in chambers 62 and 61 remain substantially the same, thus the spring 67 maintains the diaphragm 60 and contact 65 in each device in the position shown, namely, in circuit open position.

Upon such a reduction in the pressure of fluid in branch pipe 18 the several parts of the service portion 10 of the brake controlling valve device 6 are caused to move in the usual manner to service position, in which position, fluid under pressure is supplied from the auxiliary reservoir 3 to the brake cylinder 5 by way of a service port 83 in the main slide valve 22 and passage and pipe 78.

Upon a service rate of reduction in brake pipe pressure, the emergency piston 24 and auxiliary slide valve 34 move outwardly from their release position until such time as a port 84 in the auxiliary slide valve is opened to a port 85 in the main slide valve 33, at which time fluid under pressure flows from the valve chamber 27 and connected quick action chamber 32 to the atmosphere at substantially a service rate, through said ports and an atmospheric passage 86. Since the rate of reduction in quick action chamber pressure is substantially the same as the rate of reduction in brake pipe pressure, the emergency piston and auxiliary slide valve will come to a stop before the main slide valve 33 is operatively engaged by the piston stem, thus preventing an unwanted emergency application of the brakes.

*Release of the brakes following a service application*

When it is desired to release the brakes, the brake pipe pressure is increased in the usual manner, and as a consequence, the pressure in branch pipe 18 and in the branch pipe 64 at each end of the car is increased.

An increase in the pressure of fluid in pipe 64 at each end of the car results in a corresponding increase in the pressure of fluid in chambers 62 and 61 of each of the switch devices 8 in the manner hereinbefore described in connection with initial charging of the equipment.

An increase in the pressure of fluid in branch pipe 18 causes the several parts of the brake controlling valve device 6 to move to release position in which position they are shown. In this position, fluid under pressure is vented from the brake cylinder 5 to the atmosphere, and the charging communications between the auxiliary reservoir 3 and emergency reservoir 4 are reestablished, all of which will be readily understood from the description of the initial charging of the equipment.

*Emergency application of the brakes*

When it is desired to effect an emergency application of the brakes the brake pipe pressure is reduced at an emergency rate in the usual manner and, upon such a rate of reduction in brake pipe pressure, the pressure in branch pipes 64 and branch pipe 18 is reduced at substantially the same rate.

If such a reduction is initiated on the left hand end of a car equipped as shown, the reduction will be quickly effective in the branch pipe 64 at this end of the car and as a consequence in chamber 62 of the switch device 8 also at this end of the car.

It will here be noted that the port 63 in the diaphragm 60 is of such size that the pressure in chamber 61 at the opposite side of the diaphragm cannot reduce as fast as the pressure in chamber 62 when an emergency rate of reduction is made, so that upon an emergency rate of reduction in chamber 62, a sufficient differential of pressure is built up on the diaphragm 60 to cause the diaphragm to flex downwardly and thereby move the contact 65 into engagement with the stationary contact 66.

It will be understood that if the emergency rate of reduction is initiated at the right hand end of the car the switch device 8 at this end of the car will be quickly effective to establish contact between the movable and stationary contacts 65 and 66, respectively.

With the contact 65 in engagement with the contact 66 of the switch device 8 at either end of the car the electro-magnet 55 will be energized due to the flow of current from the storage battery 9 through the magnet winding, the circuit for energizing the electro-magnet comprising the positive terminal of the storage battery 9, wires 74 and 73, stationary contact 66, movable contact 65 of either switch device 8, wires 70 and 71 coil or winding of the electro-magnet 55, wire 72 and negative terminal of the storage battery 9.

Energization of the winding of the electro-magnet 55 of the device 7 will cause the stem 51 of the device to move in a direction toward the right hand against the opposing pressure of the spring 53. Since the end of the stem 51 is in engagement with the vent valve piston 40, such movement causes this piston to move in the same direction, thereby unseating the vent valve 36 against the opposing pressure of the spring 42. With the vent valve 36 unseated, fluid under pressure is vented at a very rapid rate from the brake pipe 1 to the atmosphere by way of branch pipe 18 and passages 17, 16, and 39, vent valve chamber 38, past unseated valve 36 and through chamber 44. This rapid reduction in brake pipe pressure will be transmitted through the hose couplings 2 to the brake pipe 1 and consequently to the branch pipe 64 of the equipment of the adjacent coupled car, where the operation just described will be repeated.

Since the pressure of fluid in chamber 61 of the switch device 8 is slowly vented through port 63 in the diaphragm chamber 62 and pipe 64 to the brake pipe the opposing fluid pressures acting on the diaphragm 60 finally becomes substantially equalized and the spring 67 is consequently permitted to move the diaphragm upwardly thereby causing the contact 65 to be moved out of engagement with the stationary contact 66, as shown in the drawing. When this occurs, the circuit for energizing the coil or winding of the electro-magnet will be deenergized, however, the vent valve 36 may or may not be seated at this time as hereinafter described.

Upon the emergency rate of reduction in brake pipe pressure, the several parts of the service portion 10 and the emergency portion 12 of the brake controlling valve device are caused to move to their outermost or emergency application position in the usual manner.

With the several parts of the brake controlling valve device in emergency position, fluid under pressure flows from both the auxiliary reservoir 3 and the emergency reservoir 4, to the brake cylinder 5 to effect an emergency application of the brakes. The flow of fluid from the auxiliary reservoir 3 to the brake cylinder 5 is by way of pipe and passage 21, valve chamber 20, service port 85 in the service slide valve 22 and pipe and passage 78 and the flow of fluid from the emergency reservoir is by way of a pipe and passage 90, a cavity 91 in the emergency slide valve 33 and passage and pipe 78.

The emergency piston 24 in its traverse toward emergency position moves the auxiliary slide valve 34 relative to the main slide valve 33 and then causes both the auxiliary and main slide valve 34 and 33, respectively, to move in unison to emergency position. Upon movement of the auxiliary slide valve 34 relative to the main slide valve 33, the auxiliary slide valve uncovers a port 93 which is in registration with a passage 94 leading to a piston chamber 95 for the quick action or vent valve piston 40. With this communication established fluid under pressure flows from the emergency slide valve chamber 27 and connected quick action chamber 32 to the vent valve piston chamber 95 by way of port 93 in the slide valve 33 and passage 94.

As the piston 24 continues to move and the main slide valve 33 is caused to move with the auxiliary slide valve 34 the port 93 is moved out of communication with the passage 94 and at substantially the same time as this occurs the main slide valve uncovers the passage 94, so that there will be no material interruption in the flow of fluid from the emergency valve chamber 27 and connected quick action chamber 32 to the vent valve piston chamber 95, thereby insuring that the vent valve 36 will be held in the unseated position long enough to effect the desired venting of fluid under pressure from the brake pipe even though the switches 8 may have operated in the manner previously described to deenergize the winding of the electromagnet 55 of the device 7.

With the quick action or vent valve piston 40 in the position for unseating the vent valve 36, fluid under pressure is gradually vented from the emergency slide valve chamber 27 and quick action chamber 32 to the atmosphere, in the usual manner, by way of a restricted passage 96 in the piston 40. When the pressure of fluid in the quick action chamber has been reduced to a predetermined degree by the flow of fluid through passage 96, the spring 42 acts to close vent valve 36 and also acts through the medium of the stem 41 to return the piston 40 to its normal or extreme outer position in which it is shown in the drawing. At the same time, since the winding of the electromagnet 55 is deenergized, the spring 53 in the device 7 acts through the medium of collar 54 to move the guide member 50 and attached stem 51 to the position shown. The rate at which the quick action chamber pressure reduces through the restricted passage 96 is slow enough to insure the vent valve 36 remaining open until substantially the complete venting of fluid under pressure from the brake pipe has been accomplished.

*Release of the brakes following an emergency application*

When it is desired to release the brakes, the brake pipe pressure is increased in the usual manner, and as a result chambers 62 and 61 of each switch device 8 is charged in the manner described in connection with initial charging. At the same time under the influence of an increase in fluid under pressure in the brake pipe, the several parts of the brake controlling valve device 6 will move to release position and the system will be recharged and the brakes released in the manner previously described in connection with initial charging.

*Summary*

It will be apparent that apparatus such as disclosed in the accompanying drawing will propagate an emergency impulse electrically without the necessity of train wires extending from one car to the next, and will result in substantially simultaneously emergency brake application on all the cars throughout the length of the train.

It will be understood that cars embodying the invention as disclosed in the accompanying drawing having the herebefore described improved operating characteristics, will operate satisfactorily in a train of mixed cars, that is in a train having some of the cars equipped with my improved brake equipment, and other cars equipped with the usual type of fluid pressure brakes and will decrease the over all time for the propagation of an emergency application of the brakes over that required in a train of cars equipped with the usual fluid pressure brakes. However, it will be obvious that the maximum reduction in time of propagation will be obtained if all the cars in the train embody the invention.

Having now described my invention, what I claim as new and desire to secure by Letters Patent, is:

1. In a fluid pressure brake system for a vehicle, in combination, a normally charged brake pipe, a valve operative to discharge fluid under pressure from said brake pipe, electrical means for effecting operation of said valve to discharge fluid from the brake pipe, pneumatic means for also effecting operation of said valve to discharge fluid from the brake pipe, and means responsive to a reduction in brake pipe pressure for effecting operation of said electrical means to operate said valve, said pneumatic means being effective to operate said valve in the event of the failure of said electrical means to operate the valve.

2. In a fluid pressure brake system for a vehicle, in combination, a normally charged brake pipe, a valve operative to discharge fluid under pressure from said brake pipe, electrical means for effecting operation of said valve to discharge fluid from the brake pipe, pneumatic means responsive to an increase in the pressure of fluid for also effecting operation of said valve to discharge fluid from the brake pipe, a switch device responsive to an emergency rate of reduction in brake pipe pressure for effecting operation of said electrical means to operate said valve, and means responsive to an emergency rate of reduction in brake pipe pressure for effecting operation of said pneumatic means to operate said valve in the event of failure of said electrical means to operate said valve.

3. In a fluid pressure brake system for a vehicle, in combination, a normally charged brake pipe, a valve having a normally closed position and movable to an open position to discharge fluid under pressure from said brake pipe, electrical means for moving said valve to its open position, means responsive to a reduction in brake pipe pressure for effecting operation of said electrical means for moving said valve, and means operative upon said reduction in brake pipe pressure for causing said valve to be maintained in its open position for a predetermined period of time in the event of the failure of said electrical means to hold the valve in its open position.

4. In a fluid pressure brake system, in combination, a normally charged brake pipe, a quick action valve device operative to discharge fluid under pressure from said brake pipe, fluid pressure responsive means operative upon an emergency rate of reduction in brake pipe pressure for effecting operation of said quick action valve device to discharge fluid under pressure from the brake pipe, and electrical means also responsive to an emergency rate of reduction in brake pipe for effecting the operation of said quick action valve device.

5. In a fluid pressure brake system, in combination, a normally charged brake pipe, a quick action valve device operative to discharge fluid under pressure from said brake pipe, fluid pressure responsive means operative upon an emergency rate of reduction in brake pipe pressure for effecting operation of said quick action valve device to discharge fluid under pressure from the brake pipe, and electrical means responsive to an emergency rate of reduction in brake pipe for effecting the operation of said quick action valve, said electrical means comprising an electroresponsive device for effecting operation of said quick action valve device to discharge fluid under pressure from the brake pipe and a fluid pressure operated switch device subject to brake pipe pressure for controlling the operation of said electroresponsive device.

6. In a fluid pressure brake equipment of the type comprising a brake pipe normally charged with fluid under pressure and also comprising a brake controlling valve device having a quick action vent valve device capable of operation by fluid under pressure to vent fluid under pressure from the brake pipe and also having valve means responsive only to a sudden or emergency reduction in brake pipe pressure for supplying fluid under pressure to effect the operation of said quick action vent valve device, in combination, electrical means for effecting the operation of said quick action vent valve device, and switch means responsive to only a sudden or emergency reduction in brake pipe pressure for effecting the operating of said electrical means.

7. In a fluid pressure brake equipment of the type comprising a brake pipe normally charged with fluid under pressure and also comprising a brake controlling valve device having a quick action vent valve device capable of operation by fluid under pressure to vent fluid under pressure from the brake pipe and also having valve means responsive only to a sudden or emergency reduction in brake pipe pressure for supplying fluid under pressure to effect the operation of said quick action vent valve device, in combination, means carried by said brake controlling valve device and operative electrically for actuating said quick action vent valve device, and fluid pressure operated switch means responsive to only a sudden or emergency reduction in brake pipe pressure for effecting the operation of the electrically operated means, the fluid pressure operated switch means being disposed nearer the end of the brake pipe than the valve means of said brake controlling valve device.

8. In a fluid pressure brake equipment of the type comprising a brake pipe normally charged with fluid under pressure and also comprising brake controlling valve device having a quick action vent valve device capable of operation by fluid under pressure to vent fluid under pressure from the brake pipe and also having valve means responsive only to a sudden or emergency reduction in brake pipe pressure for supplying fluid under pressure to effect the operation of said quick action vent valve device, in combination, electrical means for effecting the operation of said quick action vent valve device, and fluid pressure operated switch means responsive to only a sudden or emergency reduction in brake pipe pressure for effecting the operating of said electrical means, said vent valve device being normally operated electrically to its venting position and being operated pneumatically to its venting position only in the event of the failure of the electrical means to operate the device.

9. A fluid pressure brake system, in combination, a normally charged brake pipe, a quick action valve operative to discharge fluid under pressure from said brake pipe, an element capable of operation by fluid under pressure for actuating said valve, electrical means operative upon a sudden or emergency reduction in brake pipe pressure for normally actuating said element and thereby said valve, and means also responsive to the sudden or emergency reduction in brake pipe pressure for supplying fluid under pressure to act upon said element.

10. In a fluid pressure brake system, in combination, a normally charged brake pipe, a quick action valve operative to discharge fluid under pressure from said brake pipe, an element normally operative electrically for actuating said valve and being capable of pneumatic operation to actuate said valve, means responsive to a sudden or emergency reduction in brake pipe pressure for effecting the electric actuation of said element, and other means also responsive to the sudden or emergency reduction in brake pipe pressure for supplying fluid under pressure to effect the pneumatic operation of said element in the event that the element fails to operate electrically.

CLAUDE M. HINES.